United States Patent [19]
Pearson

[11] 4,042,355
[45] Aug. 16, 1977

[54] POLLUTION CONTROL DEVICE

[76] Inventor: Paul W. Pearson, 7735 Mission Gorge Road, Santee, Calif. 92071

[21] Appl. No.: 514,829

[22] Filed: Oct. 15, 1974

[51] Int. Cl.² .......................................... B01D 50/00
[52] U.S. Cl. ...................................... 55/319; 55/443; 55/470; 55/473; 55/DIG. 21; 55/DIG. 30; 415/202
[58] Field of Search ................ 55/276, 317, 400, 401, 55/402, 403, 404, 405, 408, 462, 465, 473, 481, DIG. 21, DIG. 25, DIG. 30, 407, 445, 446, 443, 470, 319; 60/311; 415/54, 202

[56] References Cited
U.S. PATENT DOCUMENTS

| 652,070 | 6/1900 | Baker ..................................... 55/446 |
| 790,018 | 5/1905 | Aldrich ........................ 55/DIG. 30 |
| 815,674 | 3/1906 | Bent ..................................... 55/403 |
| 1,532,730 | 4/1925 | Chalupa et al. ................... 55/481 X |
| 1,857,348 | 5/1932 | Bokenkroger ......................... 55/446 |
| 2,382,386 | 8/1945 | Arms ................................. 55/404 X |
| 2,448,048 | 8/1948 | Porter .................................. 55/404 |
| 2,968,360 | 1/1961 | Goldsmith ............................ 55/317 |
| 3,092,206 | 6/1963 | Moreau ............................. 55/481 X |
| 3,236,045 | 2/1966 | Berger et al. ..................... 55/400 X |
| 3,238,725 | 3/1966 | Ludin ..................................... 415/54 |
| 3,280,902 | 10/1966 | Laing ..................................... 415/54 |

FOREIGN PATENT DOCUMENTS

| 395,620 | 5/1924 | Germany ............................. 55/446 |

Primary Examiner—Frank W. Lutter
Assistant Examiner—David L. Lacey
Attorney, Agent, or Firm—Ralph S. Branscomb

[57] ABSTRACT

A smog control device for use particularly on automobiles and comprising an enclosure connectable to the automotive exhaust system and having a passageway therein defined principally by baffles, and a pair of different sized vaned rotors coaxially mounted on a single shaft are disposed in the passageway such that the first smaller rotor is upstream from the second, larger rotor, whereby the first rotor is driven by the automotive exhaust flow and the second rotor is driven by the first rotor to create a partial vacuum in the passageway between the rotors, the partial vacuum being instrumental in causing the precipitation and caking of exhaust pollutants on downstream baffles which are removable for cleaning. A small motor could also be used to drive the rotors.

3 Claims, 3 Drawing Figures

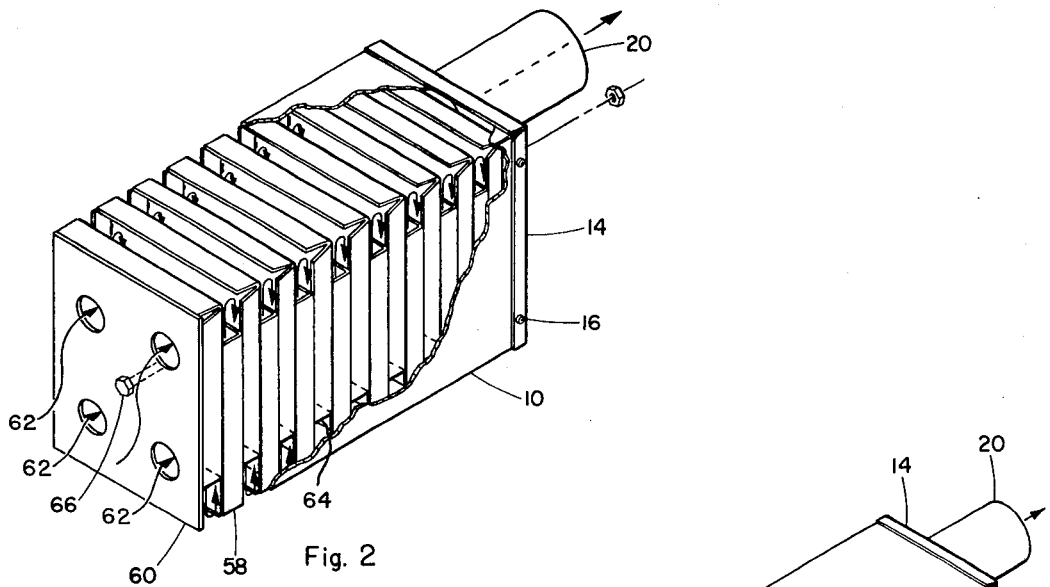
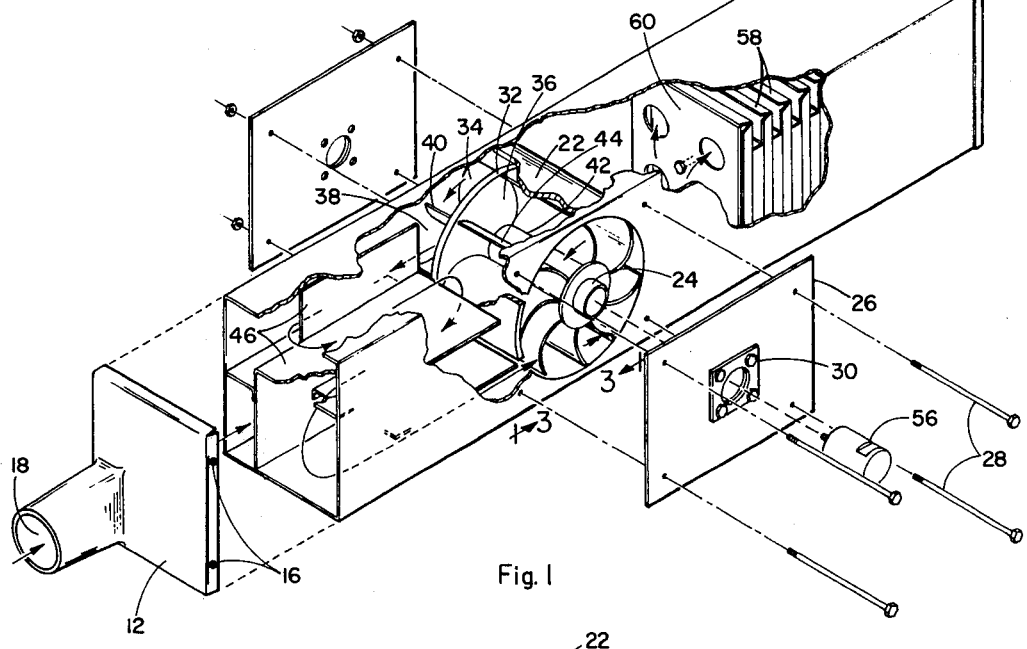

POLLUTION CONTROL DEVICE

BACKGROUND OF THE INVENTION

The invention relates to pollution control devices and primarily to automobile pollution control devices.

The increase in interest in smog control has resulted in the development of a variety of devices which are attachable to the automotive exhaust train to remove the pollutants from the emitted gases, the most favored unit until recently being catalytic converter systems. These systems, however, significantly reduce gas mileage, must be periodically re-charged, and have been found to be a cause in themselves of emitting sulphuric acid into the air. There is an obvious need for a smog control unit which is not subject to these operational problems.

SUMMARY OF THE INVENTION

The present invention fulfills the above mentioned need and comprises a pollution control unit which is purely mechanical in operation and does not depend on chemical or catalytic activity, but rather on the natural settling of the polluting particles on baffle plates as a result of the cooling of the exhaust and the creation of a pressure decrease in the gases which initiates the precipitation of water vapor and other substances.

The structure of the unit includes an elongated enclosure attachable to an automotive exhaust pipe and having extended exhaust passageway defined therein by a series of walls and baffles. Two vaned rotors are disposed in the passageway and mechanically linked and dimensioned such that the upstream rotor permits a smaller volumetric flow of gas than the downstream rotor so that a pressure reduction is effected between the rotors. The pressure reduction initiates the precipitation of water vapor and other substances which adhere to the surface of a plurality of baffles downstream of the rotors. A motor may be used to drive the rotors, or the first rotor may be driven by the exhaust gases themselves and the downstream rotor driven by the first rotor.

BRIEF DESCRIPTION OF THE DRAWINGS

FIG. 1 is an exploded isometric view of the unit with portions thereof cut away;

FIG. 2 is an isometric, partially cut away view of the rear portion of the unit showing the baffle structure;

FIG. 3 is a detail of the rotor mechanism.

DETAILED DESCRIPTION OF THE PREFERRED EMBODIMENT

The invention comprises an elongated enclosure 10 having a front end cap 12 and a rear end cap 14, both being secured to the enclosure 10 by screws 16 or other easily removable means. The front end cap has an inlet stub pipe 18 for attachment to the exhaust pipe of a vehicle and an outlet stub pipe 20 is connected to the rear cap, the flow direction being from the inlet to the outlet and elements disposed in the flow path which are closer to the outlet being defined as downstream relative to elements in the flow path farther from the outlet.

Disposed somewhat forwardly of the center of the enclosure is a cylindrical wall 22, and coaxially with this wall is an axle 24 which is journalled in the enclosure in any suitable fashion. In the illustrated embodiment a pair of side plates 26 are fastened by bolts 28 to the enclosure, each plate having a central bearing 30 in which the axle rides. It is also contemplated that the bearings 30 may be replaced with a pair of hardened carbon bearing cups and the axle be tapered on the ends and have fine carbide points to further reduce friction, and resist deterioration from the high temperatures to which the bearing surfaces will be exposed.

Mounted to either the cylindrical wall 22 or the axle 24 and being coaxial with both is a circular wall 32 which divides the space within the cylinder into a first chamber 34 and a second, larger chamber 36. Each chamber houses a rotor, of which the axle is a part, the smaller rotor 38 having vanes 40 and the larger 42 having vanes 44 which are wider than vanes 40.

A plurality of walls 46 in the forward portion of the chamber define several exhaust gas passageways which direct incoming gases as indicated by the arrows from the inlet 18 through an aperture 48 in the cylindrical wall into the smaller rotor chamber 34, from which the gas exists through aperture 50, makes three reverse bends to permit some cooling to occur, enters the second rotor chamber 36 at 52 and exists via the opening 54 into the rearward portions of the enclosure. A small motor 56 may be mounted to the enclosure to rotate the two rotors, as described hereinafter.

The operation of the structure as thusfar described is a follows. If the motor 56 is not used, the exhaust gas by its own pressure rotates the first, smaller rotor 38 and enters the passageway between the rotors defined by the walls 46, where it dissipates heat through the walls and the enclosure as it flows. The gas then enters the second rotor chamber 36, into which it is drawn at a rapid rate by the large rotor 42. The rotor 42 of course rotates at the same angular velocity as the smaller rotor but is of much greater vane area so that the volume of gas moved by rotor 42 is greater than the volume moved by rotor 38 in the same time frame so that a pressure drop is effected in the passageway between the rotors. As a result of the pressure drop, the gas in the passageway between the two rotors is not only cooled suddenly, but is less dense and therefore capable of carrying less water vapor, which results in the condensation of water vapor into a mist. The mist absorbs many of the particulate impurities in the exhaust, and after passing through the rotor 42 the exhaust is forced into contact with a series of impingement plates or baffles, as described below, whereupon the water vapor and particulate matter precipitates and adhere to the baffles. The gas emitted from the unit is therefore relatively pure, pollutant-free air.

The operation is similar if the motor 56 is used, except that the unit with the motor may be used on industrial smoke stacks and the like where the pressure of the stack gases is not sufficient to drive the rotors. The motor produces the obvious benefit of preventing a back pressure from developing in the exhaust system when used in a vehicular capacity.

The gas passageway downstream of the blowers is defined by a series of staggered baffles 58, best shown in FIG. 2. The first baffle 60 occupies the entire cross section of the enclosure and is provided with holes 62 to permit gas flow to the remaing baffles, each of which is preferably provided with flanges 64 for proper spacing. As indicated in FIG. 2, the baffles are rectangular and fit within the rectangular enclosure such as to leave an opening adjacent one edge, these openings being staggered such that the exhaust is forced to follow a serpentine path as indicated by the arrows in the drawing. The entire baffle structure is sandwiched together by a long bolt 66, which may or may not pass through the rear cap 14. Thus the baffle assembly is integral and is removable for cleaning, which is most easily done with a wire brush.

Excellent test results have been achieved with the invention as disclosed herein, not only in the significant reduction of particulate and gaseous pollutions components, but in the area of sound pollution, as well as the device functions very effectively as a muffler.

I claim:

1. A smog arrester comprising:
   a. an enclosure having an inlet for attachment to a source of polluted air and an outlet;
   b. a generally cylindrical wall disposed in said enclosure and having side plates covering the ends thereof and a generally circular wall orthogonally mounted in said cylindrical wall to define a first chamber and a second chamber larger than said first chamber and substantially sealed therefrom by said circular wall;
   c. a coaxial shaft rotationally mounted in said cylindrical sidewall and having a first rotor and a second rotor mounted on said shaft in said first and second chamber respectively, each of said rotors having a plurality of blades radially extending from, and parallel to the axis of, said shaft, the blades of both of said rotors being of substantially the same length and extending substantially to said cylindrical wall and the blades of the second rotor being wider in the axial direction than the blades of the first rotor such that the second rotor is capable of moving more gas than the first rotor when both rotors have the same angular velocity;
   d. means defining a complete passageway within said enclosure from said inlet to said outlet via said rotors, comprising:
      i. said circular wall having an entry aperture into said first chamber and ducting connecting said inlet thereto to deliver gas from said first rotor;
      ii. said circular wall having an exit aperture in said first chamber and an entry aperture in said second chamber, and including means mounted in said enclosure defining a gas expansion passageway from said first chamber exit to said second chamber entry aperture; and
      iii. a baffle housing portion in said enclosure communicating with said enclosure outlet and including an exit aperture in said circular wall leading from said second chamber and communicating with said baffle housing portion; and
   e. a plurality of baffles disposed in the baffle housing portion of said enclosure, whereby gas forced into said inlet enters said first chamber to cause rotation of said first rotor directly and said second rotor indirectly, thus causing a reduced gas pressure in said expansion passageway, and said gas then passes through said expansion passageway and said second chamber and through said baffles and through said outlet such that impingement of said gas on said baffles causes the precipitation of suspended particulates thereon.

2. The smog arrester according to claim 1 wherein said enclosure is elongated and each of said baffles is laterally oriented relative to said enclosure, and at least two opposite edges of each baffle are flanged in one longitudinal direction to provide spacer means between adjacent baffles.

3. The smog arrester according to claim 2 wherein the end portion of said enclosure having said outlet therein includes a removable outlet cap and said outlet cap and said baffles are releasably connected together to define a removable and separable unit.

* * * * *